(12) United States Patent
DeRaffele

(10) Patent No.: US 6,386,495 B1
(45) Date of Patent: May 14, 2002

(54) CABLE GUIDE APPARATUS

(76) Inventor: Angelo DeRaffele, 11 LaSalle Dr., New Rochelle, NY (US) 10801

(*) Notice: Subject to any disclaimer, the term of this patent is extended or adjusted under 35 U.S.C. 154(b) by 0 days.

(21) Appl. No.: 09/849,896

(22) Filed: May 7, 2001

(51) Int. Cl.[7] ............................................. A47B 96/06
(52) U.S. Cl. ........................................ 248/214; 248/65
(58) Field of Search .......................... 248/214, 61, 65, 248/72, 73

(56) References Cited

U.S. PATENT DOCUMENTS

| | | | | |
|---|---|---|---|---|
| 2,372,674 A | * | 4/1945 | Jordan | 248/65 |
| 2,437,344 A | * | 3/1948 | Behlmann | 174/163 |
| RE25,341 E | * | 3/1963 | Majewski | 174/158 |
| 4,006,874 A | * | 2/1977 | McGee | 248/74 R |
| 4,560,126 A | * | 12/1985 | Judkins et al. | 248/72 |
| 5,950,970 A | * | 9/1999 | Methany et al. | 248/150 |

* cited by examiner

Primary Examiner—Leslie A. Braun
Assistant Examiner—A. Joseph Wujciak, III

(57) ABSTRACT

The cable apparatus is a simple device which clamps to a metal tee bar of a hung ceiling. This enables any person pulling wire or cable through that ceiling to do so quickly and easily without the hassle of the wire binding on the metal tee bars. It will be a time saver for electricians, telephone wire and cable installers. The device will be made of durable rounded plastic with the clamping section made of metal. The cable apparatus will be clamped to one corner of the tee bar ceiling attaching to at least one main runner on one side for a sturdy connection. It most likely will be placed as close as possible to the sourse of power. The cable to be installed can be placed on the floor, or otherwise, and the end of the cable extended over the rounded apparatus. Installers can then pull the wire through the ceiling with ease, thus eliminating the problem of binding and damaging the metal tee bars.

1 Claim, 3 Drawing Sheets

CABLE GUIDE APPARATUS

DESCRIPTION

A cable guide apparatus that is mounted on a first ceiling support includes a first clamp portion for clamping onto the first ceiling support. The first clamp portion extends along a first longitudinal axis. A first curved guide portion is connected to the first clamp portion, wherein the first curved guide portion extends in a direction parallel to the first longitudinal axis. The first curved guide portion includes a first curved surface which is curved in a direction circumferential with respect to the first longitudinal axis. A first end fence is connected to a first end of the first curved guide portion. The first end fence includes a first riser portion which extends up above the first curved surface. The cable guide apparatus is used to guide a cable over the first curved surface to prevent the cable from being blocked by flat surfaces on the first ceiling support.

For both the first ceiling support and a second ceiling support which is perpendicular to the first ceiling support, a second clamp portion is provided for clamping onto the second ceiling support. The second clamp portion extends along a second longitudinal axis which is perpendicular to the first longitudinal axis. A second curved guide portion is connected to the second clamp portion, wherein the second curved guide portion extends in a direction parallel to the second longitudinal axis and includes a second curved surface which is curved in a direction circumferential with respect to the second longitudinal axis. A second end fence is connected to a second end of the second curved guide portion. The second end fence includes a second riser portion which extends up above the second curved surface. An intermediate fence is located between the first curved guide portion and the second curved guide portion. The intermediate fence is oriented at a forty-five degree angle between the first curved guide portion and the second curved guide portion. The cable guide apparatus is used to guide a first cable over the first curved surface and to guide a second cable over the second curved surface to prevent the respective cables from being blocked by flat surfaces on the first ceiling support and the second ceiling support.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein.

DESCRIPTION OF THE PREFERRED EMBODIMENT

Figure 1:
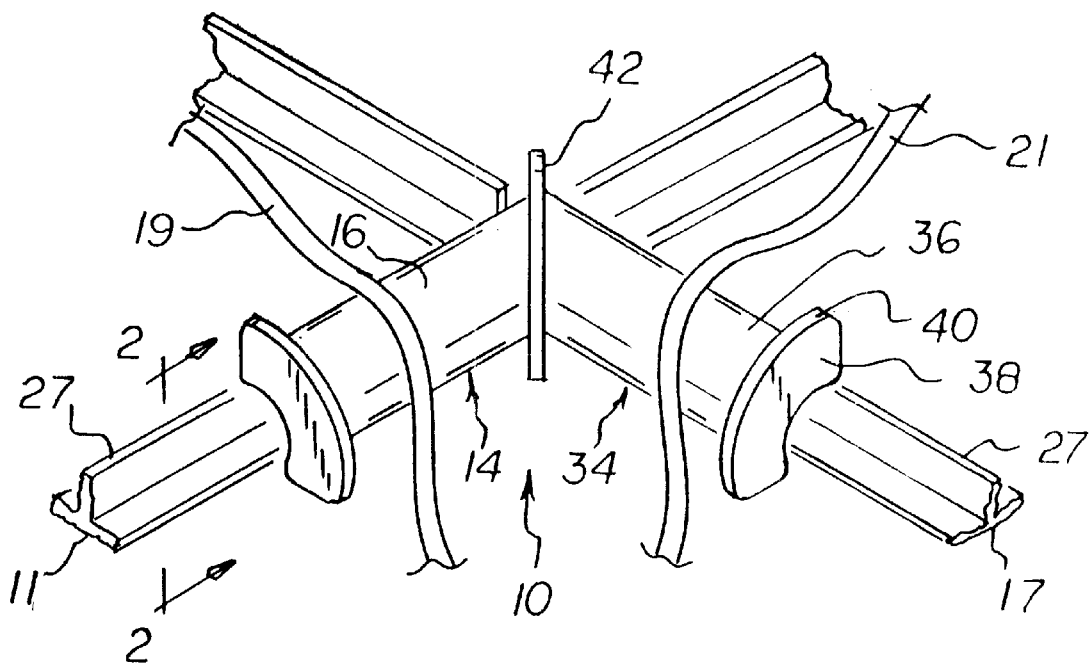
FIG. 1 is a top front perspective view showing a preferred embodiment of the cable guide apparatus of the invention installed on two perpendicularly intersecting inverted T-shaped ceiling supports.
Figure 2:
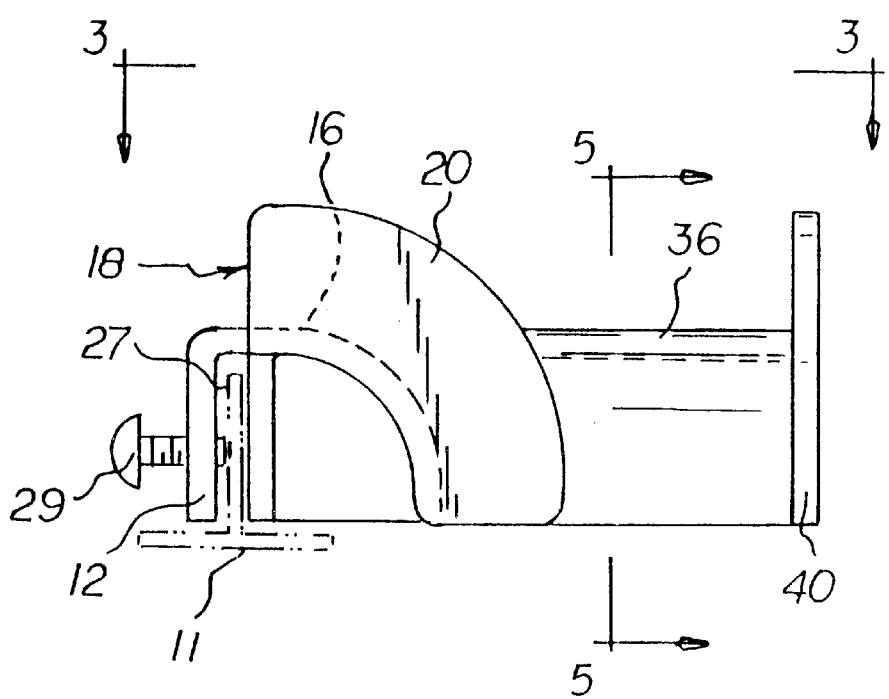
FIG. 2 is a partial end view of the embodiment of the cable guide apparatus shown in FIG. 1 taken along line 2—2 of FIG. 1.
Figure 3:
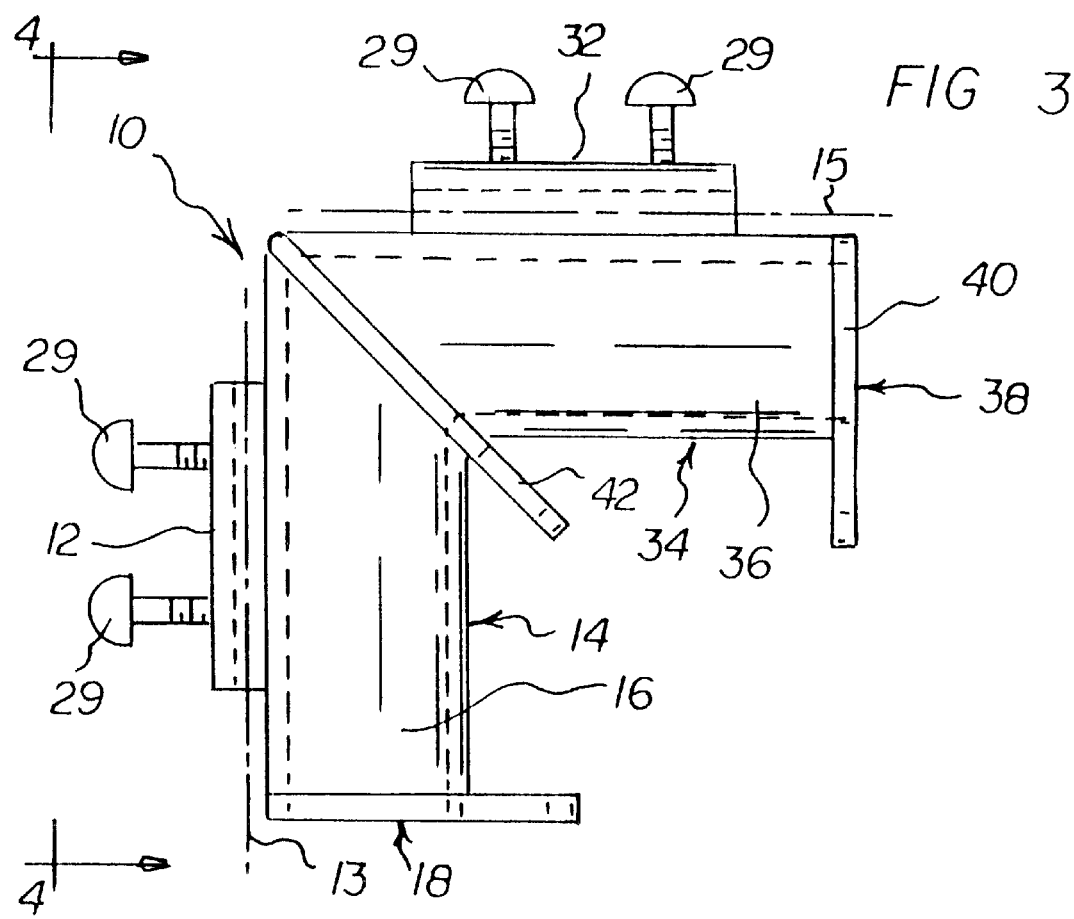
FIG. 3 is a top of the embodiment of the cable guide apparatus of FIG. 2 taken along line 3—3 thereof.
Figure 4:
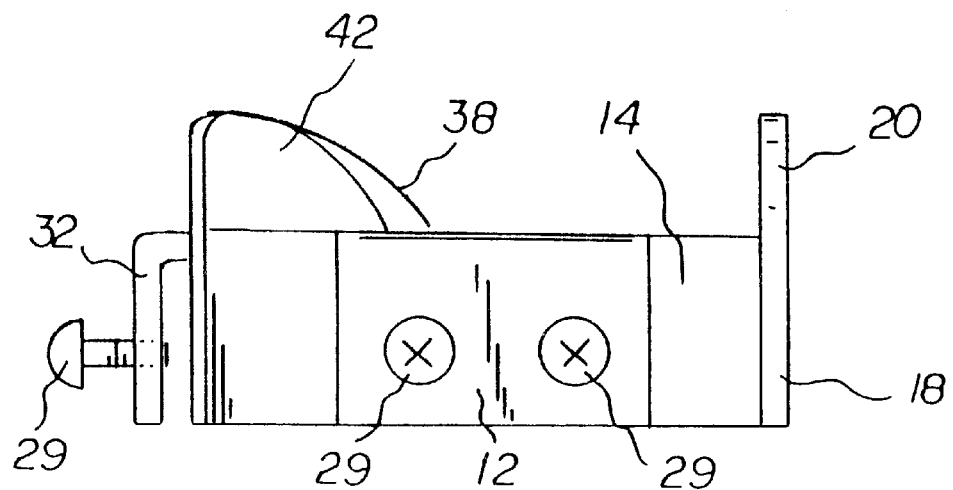
FIG. 4 is a side view of the embodiment of the invention shown in FIG. 3 taken along line 4—4 thereof.
Figure 5:
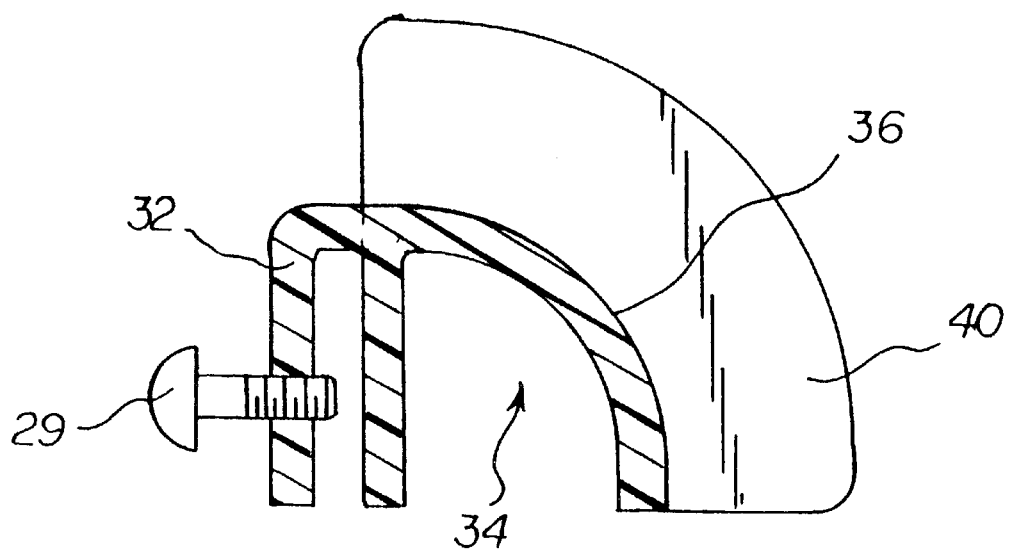
FIG. 5 is a cross-sectional view of the embodiment of the invention shown in FIG. 2 taken along line 5—5 thereof.
Figure 6:
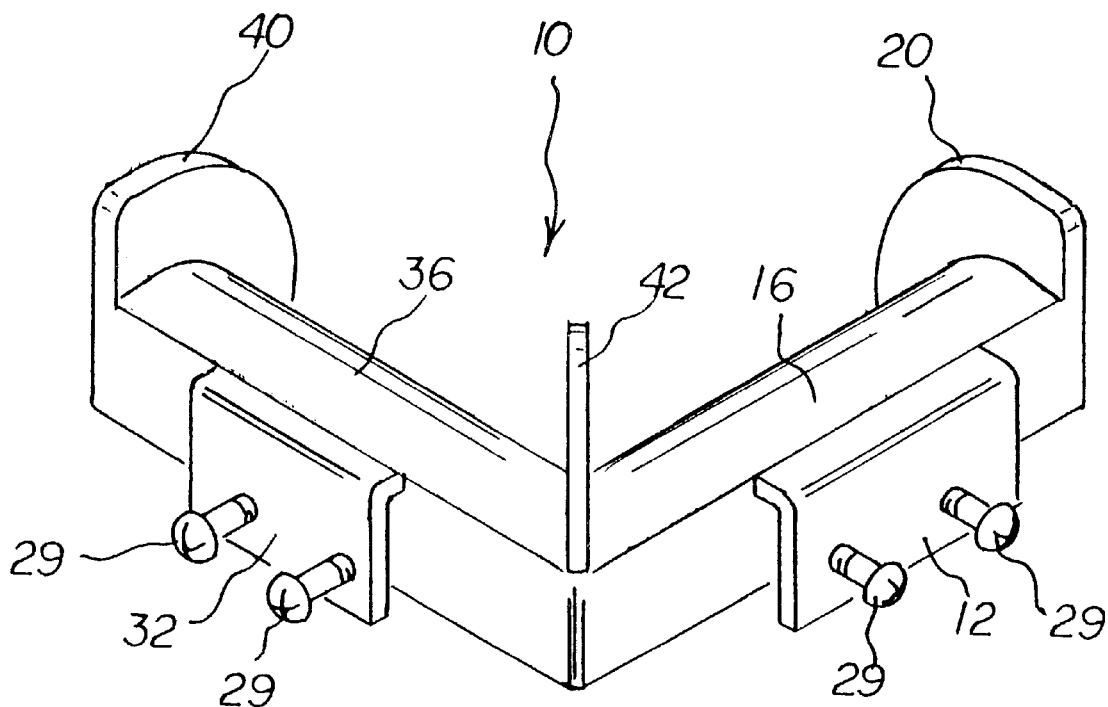
FIG. 6 is a top rear perspective view showing the embodiment of the invention shown in FIG. 1 removed from the ceiling supports.

With reference to the drawings, a new and improved cable guide apparatus embodying the principles and concepts of the present invention will be described.

Turning to FIGS. 1–6, there is shown an exemplary embodiment of the cable guide apparatus of the invention generally designated by reference numeral 10. An embodiment of the cable guide apparatus 10 that is mounted on a first ceiling support 11 includes a first clamp portion 12 for clamping onto the first ceiling support 11. The first clamp portion 12 extends along a first longitudinal axis 13. A first curved guide portion 14 is connected to the first clamp portion 12, wherein the first curved guide portion 14 extends in a direction parallel to the first longitudinal axis 13. The first curved guide portion 14 includes a first curved surface 16 which is curved in a direction circumferential with respect to the first longitudinal axis 13. A first end fence 18 is connected to a first end of the first curved guide portion 14. The first end fence 18 includes a first riser portion 20 which extends up above the first curved surface 16.

For both the first ceiling support 11 and a second ceiling support 17 which is perpendicular to the first ceiling support 11, a second clamp portion 32 is provided for clamping onto the second ceiling support 17. The second clamp portion 32 extends along a second longitudinal axis 15 which is perpendicular to the first longitudinal axis 13. A second curved guide portion 34 is connected to the second clamp portion 32, wherein the second curved guide portion 34 extends in a direction parallel to the second longitudinal axis 15 and includes a second curved surface 36 which is curved in a direction circumferential with respect to the second longitudinal axis 15. A second end fence 38 is connected to a second end of the second curved guide portion 34. The second end fence 38 includes a second riser portion 40 which extends up above the second curved surface 36. An intermediate fence 42 is located between the first curved guide portion 14 and the second curved guide portion 34. The intermediate fence 42 is oriented at a forty-five degree angle between the first curved guide portion 14 and the second curved guide portion 34.

To use any embodiment of the cable guide apparatus 10 of the invention, the respective guide apparatus is attached to a ceiling support, and a cable 19 is moved onto the respective guide apparatus. The respective curved surface of the respective curved guide portion permits the cable 19 to slide over the respective guide apparatus so that the cable 19 is not blocked by flat surfaces of the ceiling support. The respective riser portions prevent the cable 19 from sliding off of the respective curved surface.

More specifically, if an embodiment of the invention is provided for attachment to only a first ceiling support 11, then that embodiment of the invention includes only the first clamp portion 12, the first curved guide portion 14, the first end fence 18, and a supplemental end fence (not shown) that can be present at an end of the first curved guide portion 14, opposite to the first end fence 18.

On the other hand, if an embodiment of the invention is provided for attachment to both a first ceiling support 11 and a perpendicularly oriented second ceiling support 17, such as shown in FIG. 1, then that embodiment of the invention includes the first clamp portion 12, the first curved guide portion 14, the first end fence 18, the intermediate fence 42, the second curved guide portion 34, the second end fence 38, and the second clamp portion 32. With this embodiment of the invention, a second cable 21, which comes in at a direction perpendicular to the first cable 19, can use the second curved guide portion 34 of the invention to be guided around the flat surfaces of the second ceiling support 17.

As shown in the drawings, each of the first ceiling support 11 and the second ceiling support 17 has a vertical riser portion 27. Each of the first clamp portion 12 and the second clamp portion 32 receives a respective vertical riser portion 27, and respective clamping screws 29 are turned to clamp the respective clamp portion onto the respective vertical riser portion 27.

After the cable guide apparatus 10 of the invention has been used, the respective clamping screws 29 are loosened, and the cable guide apparatus 10 is removed from the first ceiling support 11 and the second ceiling support 17.

The components of the cable guide apparatus of the invention can be made from inexpensive and durable metal and plastic materials.

The foregoing detailed description is considered as illustrative only of the principles of the invention. Numerous modifications and changes will readily occur to those skilled in the art and therefore, it is not desired to limit the invention to the exact construction and operation shown and described. Accordingly, all suitable modifications and equivalents falling within the broad scope of the subject matter described above may be resorted to in carrying out the present invention.

What is claimed is:

1. A cable guide apparatus adapted to be mounted to a first ceiling support and a second ceiling support wherein the first and second ceiling supports are perpendicular to each other, said cable guide apparatus including a first clamp portion adapted to be mounted on the first ceiling support, a first curved guide portion connected to the first clamp portion and extending in a direction substantially parallel to a first longitudinal axis, said first curved guide portion including a first curved surface which is curved in a direction circumferential with respect to the first longitudinal axis, said first curved guide portion having a first end fence connected at a first end of the first curved guide portion, said first end fence including a first riser portion which extends up above the first curved surface, said cable guide apparatus including a second clamp portion adapted to be mounted on the second ceiling support, a second curved guide portion connected to the second clamp portion and extending in a direction substantially parallel to a second longitudinal axis, said second curved guide portion including a second curved surface which is curved in a direction circumferential with respect to the second longitudinal axis, said second curved guide portion having a second end fence connected at a second end of the second curved guide portion, said second end fence including a second riser portion which extends up above the second curved surface, an intermediate fence located between said first curved guide portion and said second curved guide portion, said first clamp portion adapted to receive a vertical riser portion of the first ceiling support and said second clamp portion adapted to receive a vertical riser portion of the second ceiling support, said first and second clamp portions have a clamping means to secure their respective vertical riser portion of the first and second ceiling support, whereby the respective curved surfaces of the respective curved guide portions permit a cable to slide over the respective guide apparatus so that the cable is not blocked by flat surfaces of the ceiling support and whereby the respective riser portions prevent a cable from sliding off the respective curved surface.

* * * * *